Figure 1:
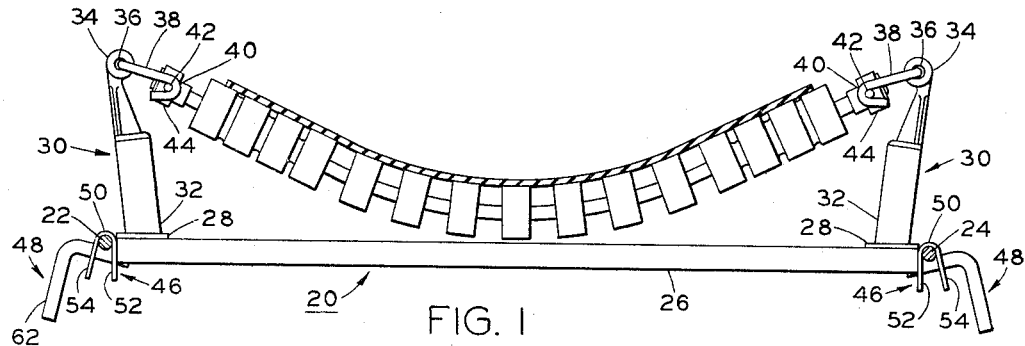

Oct. 12, 1965        L. W. DILGARD        3,211,276
CONVEYOR APPARATUS

Filed Dec. 30, 1960        2 Sheets-Sheet 1

INVENTOR:
LEMOYNE W. DILGARD
BY
*E. Wallace Breisch*

ATTORNEY:

Oct. 12, 1965  L. W. DILGARD  3,211,276
CONVEYOR APPARATUS
Filed Dec. 30, 1960  2 Sheets-Sheet 2
INVENTOR:
LEMOYNE W. DILGARD
BY
ATTORNEY
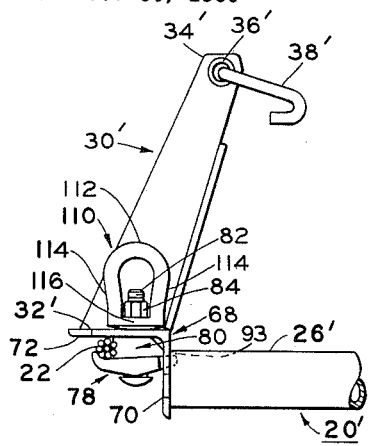
FIG. 7
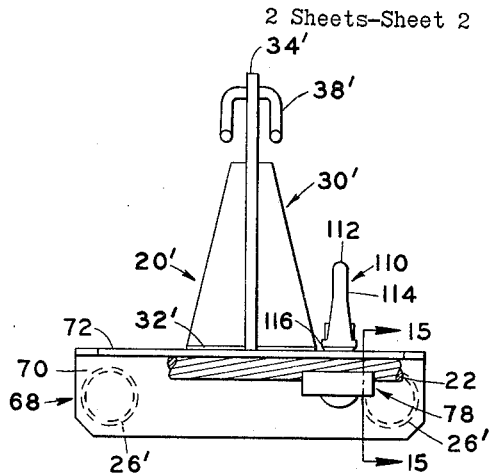
FIG. 8
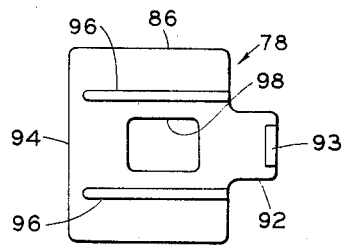
FIG. 9
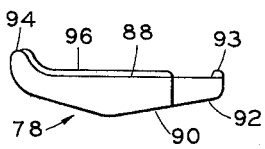
FIG. 10
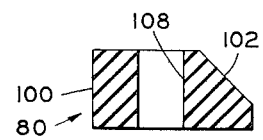
FIG. 11
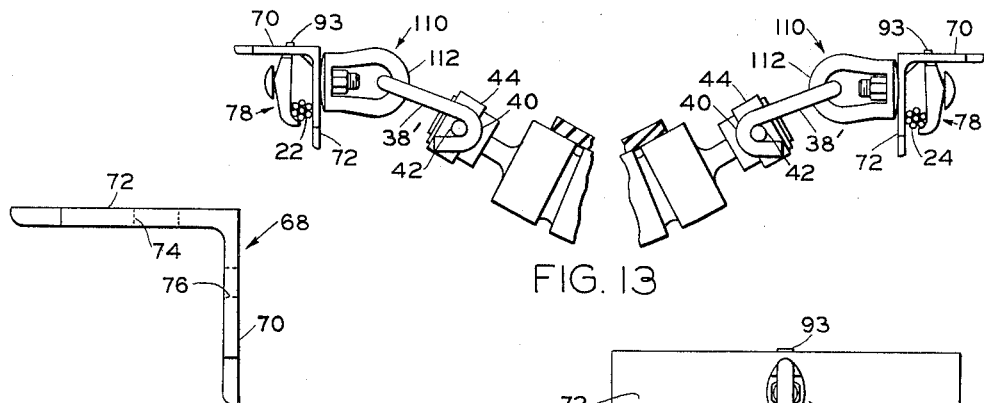
FIG. 13
FIG. 12
FIG. 14
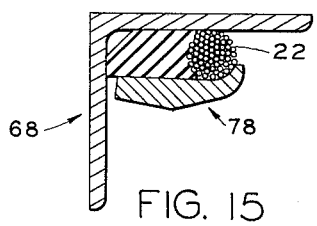
FIG. 15

United States Patent Office 3,211,276
Patented Oct. 12, 1965

3,211,276
CONVEYOR APPARATUS
Lemoyne W. Dilgard, Alamo, Calif., assignor to Joy Manufacturing Company, Pittsburgh, Pa., a corporation of Pennsylvania
Filed Dec. 30, 1960, Ser. No. 79,892
3 Claims. (Cl. 198—192)

This invention relates to a conveyor apparatus and more specifically to a device for mounting an idler between the laterally spaced ropes or the like of a rope frame conveyor or the like.

In the past cradle frames have been mounted between the laterally spaced side ropes, rods or pipes comprising the conveyor frame and the idlers have been pivotally mounted on the cradles. Alternatively the cradles have been eliminated and idlers have been mounted for limited pivotal movement by mounting means secured directly to the side ropes and the like of a rope frame conveyor or the like. In each of the above cases the problem of securing either the cradle as in the first case mentioned above or the idlers themselves as in the latter case mentioned above has existed. Various securing means have been employed such as U-bolts and plates members, U-shaped brackets and cooperating wedges, and U-shaped brackets and set screws for securing the mounting means to the side ropes or the like of a rope frame conveyor or the like. As will be appreciated by those skilled in the art the use of U-bolts and plate members requires the removal of U-bolt from its plate member during installation or removal of the securing means on the rope. Further the U-bolt and plate member securing means has the disadvantage of requiring wrenches for installation and removal as well as comprising considerable loose hardware such as bolts, nuts, lock washers, etc. that may become lost.

The U-shaped bracket and wedge requires the use of a hammer to drive in the wedge in installation and accordingly the wedge may not be driven in tight enough thus resulting in the mounting members shifting longitudinally on the rope or alternatively the wedge may be driven in too tightly thus causing damage to the strands in the rope itself.

The U-shaped bracket and set screw in addition to requiring the use of a wrench for installation and removal has the disadvantage of concentrating the clamping stress at a point along the rope and if tightened too tightly will cause damage to the rope.

With the present invention a means for freely pivotally mounting an idler between the laterally spaced ropes of a rope frame conveyor is provided which is simple to install and remove, has a positive securing means, does not inflict damage to the side ropes and does not require assembly or disassembly during installation and removal thereof.

Accordingly an object of the present invention is the provision of a new and improved conveyor apparatus for mounting an idler between the side ropes or the like of a rope frame conveyor or the like characterized by a novel means for rigidly securing a mounting means to the side ropes or the like of a rope frame conveyor or the like.

Another object of this invention is to provide a new and improved conveyor apparatus for pivotally mounting an idler between the side ropes or the like of a rope frame conveyor or the like characterized by a novel means which is adapted to easily and quickly secure or release a pivotal mounting means with respect to the side ropes or the like of a rope frame conveyor or the like.

A further object of this invention is to provide a new and improved conveyor apparatus for pivotally mounting an idler between the side ropes or the like of a rope frame conveyor or the like characterized by a novel cam means which is adapted to easily and quickly secure or release a pivotal mounting means with respect to the side ropes or the like of a rope frame conveyor or the like without the use of assembly tools.

Still another object of this invention is to provide a new and improved conveyor apparatus for pivotally mounting an idler between the side ropes or the like of a rope frame conveyor or the like characterized by a novel clamp means and cooperating frictional means which is adapted to easily and quickly secure or release a pivotal mounting means with respect to the side ropes or the like of a rope frame conveyor or the like.

Figure 2:
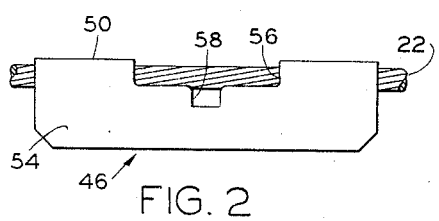
Figure 3:
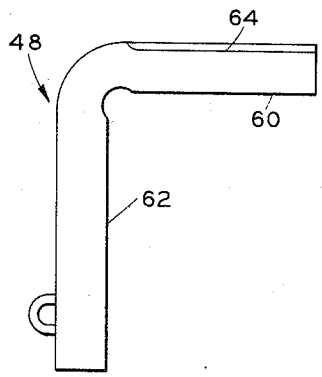
Figure 4:
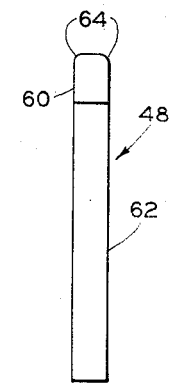
Figure 5:
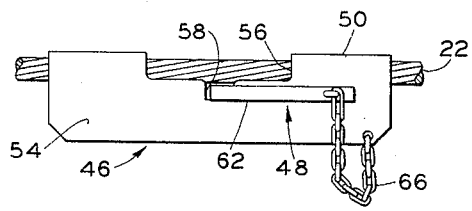
Figure 6:
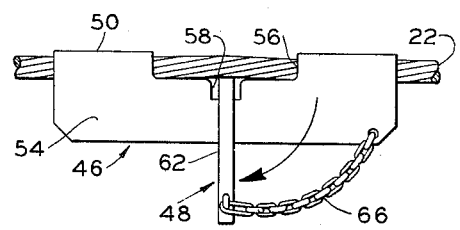

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a front elevational view of one embodiment of a conveyor apparatus constructed in accordance with the principles of this invention with a conveyor belt shown in section and supported on an idler, FIG. 2 illustrates a side elevational view of the cam bracket of FIG. 1 mounted on a rope, FIG. 3 is a front elevational view of the cam lever shown in FIG. 1, FIG. 4 is a right side elevational view of the cam lever of FIG. 3, FIG. 5 is a side elevational view of the cam bracket and cam lever of FIG. 1 with the cam lever in the unclamped position with respect to the rope, FIG. 6 is a side elevational view of the cam bracket and cam lever of FIG. 1 with the cam lever in the clamped position with respect to the rope, FIG. 7 is a fragmentary front elevational view of another embodiment of a conveyor apparatus constructed in accordance with the principles of this invention, FIG. 8 is a left side elevational view of the apparatus of FIG. 7, FIG. 9 illustrates a top plan view of the clamp of the apparatus of FIGS. 7 and 13, FIG. 10 is a side elevational view of the clamp of FIGS. 7 and 13, FIG. 11 is a front elevational view in section of the compression block of the apparatus of FIGS. 7 and 13, FIG. 12 is a front elevational view of the angle bracket of the apparatus of FIGS. 7 and 13, FIG. 13 illustrates another embodiment of a conveyor apparatus constructed in accordance with the principles of this invention with an idler and conveyor belt having the middle portions thereof respectively broken away, FIG. 14 is a side elevational view of the conveyor apparatus of FIG. 13 and FIG. 15 is a sectional view taken along line 15—15 of FIG. 8 looking in the direction of the arrows.

Referring now to FIG. 1 of the drawing one embodiment of a conveyor apparatus constructed in accordance with the principles of this invention is shown as comprising a generally U-shaped idler supporting cradle 20 which is adapted to be rigidly secured by a novel securing means between the laterally spaced side ropes 22, 24 of a rope frame conveyor. Although not shown it is to be understood of course that a plurality of such cradles are supported in longitudinally spaced relationship on the side ropes 22, 24 extending longitudinally along either side of an elongated path over which material is to be conveyed and the side ropes 22, 24 are supported above such a path by suitable support stands, not shown. Further, it is to be understood that although reference will be made to side ropes throughout this specification the conveyor apparatus described hereinafter is not restricted to use with ropes as the side supporting members but may be used equally well with pipes, rods and the like as the side supporting members.

The U-shaped cradle 20 of FIG. 1 comprises a suitable base portion having spaced arm portions extending vertically therefrom. The base portion consists of a pair of parallel spaced elongated tubular members 26 (only one of which is shown in FIG. 1) extending transversely between the elongated side ropes 22, 24. A pair of laterally spaced elongated plate members 28 extend transversely between the adjacent longitudinal end portions of the tubular members 26 respectively and are suitably rigidly secured thereto in any known manner such as by welding, for example. The laterally spaced arm portions of the U-shaped cradle 20 comprise a pair of elongated upright support members 30. Each support member is rigidly secured at its base portion 32 to its respective plate member 28 intermediate the longitudinal ends thereof. The end portion 34 remote from the base portion 32 of each support member 30 has a transverse opening 36 therein extending generally parallel to the longitudinal axis of its respective plate member 28. Pivotally mounted through each opening is a generally U-shaped hanger member 38 having the two arm portions thereof (only one of which is shown) extending inwardly toward the longitudinal center of the elongated tubular members. The free ends of each arm portion of each U-shaped hanger member is reversedly bent so as to provide a U-shaped pivotal mounting means 40 for a respective one of a pair of diametrically opposed trunnions 42 extending radially outwardly from the housing 44 of an anti-friction bearing in which the idler is rotatably mounted.

The means for securing the cradle 20 to the side ropes 22, 24 of the conveyor comprises an elongated inverted U-shaped cam bracket 46 and a cooperating cam lever 48 located at each longitudinal end of the base portion of the cradle 26 as viewed in FIG. 1. As will be noted with reference to FIG. 1 the cam bracket 46 has a bight or curved portion 50 with two depending spaced arm portions 53, 54 defining an opening therebetween. Each cam bracket 46 is suitably rigidly secured at spaced portions of the outer surface of one arm portion 52 to the respective adjacent ends of the tubular members 26 and extends transversely therebetween.

As will be noted with reference to FIG. 2 the cam bracket 46 has a transverse U-shaped slot 56 extending entirely through the bight portion 50 and a portion of the arm portions 52, 54 adjacent thereto. The base of slot 56 is elongated along the longitudinal extent of the intermediate portion of cam bracket 46 and the depth of the slot 56 is substantially the same as the diameter of ropes 22, 24. Each arm portion 52 and 54 has a generally U-shaped cam lever slot 58 located in the intermediate portion of the base of the slot 56. The cam lever slots 58 are transversely aligned.

As will be noted with reference to FIGS. 3-6 the cam lever 48 comprises an L-shaped lever formed from a rectangular bar stock. Cam lever 48 has a cam portion 60 and a lever portion 62. The smallest dimension or width of cam lever 48 is slightly less than the depth of cam lever slot 58 so as to allow the insertion of the cam portion 60 into the opening defined by the rope 22 and the cam lever slot 58 as shown in FIG. 5. The thickness of cam lever 48 as shown in FIG. 6 is substantially greater than the depth of the cam lever slot 58 so as to cause a rope 22 encompassed by the cam bracket 46 to be compressed against the inner surface of the bight portion 50 of the cam bracket 46 when cam lever 48 is rotated 90° from the cam lever position shown in FIG. 5. The longitudinal edges 64 of the cam portion 62 of the cam lever 48 may be suitably radiused as shown in FIG. 3 to facilitate the rotating of the cam portion 60 in the cam lever slot 58 in the cam bracket 46. A suitable means for captively securing cam lever 48 to the cam bracket 46 may be provided such as a chain 66 secured at one end to the lever portion 62 of cam lever 48 and at the other end to cam bracket 46.

The conveyor apparatus described above is mounted on and secured to the side ropes 22, 24 of a rope frame conveyor in the following manner. The cam levers 48 are removed from the cam lever slots 58 in both cam brackets 46 respectively. The cradle 20 is raised above the side ropes 22, 24 of a rope frame conveyor. The open ends of the cam brackets 46 are aligned with the side ropes 22, 24 respectively. The cradle 20 is lowered onto the side ropes 22, 24 until the cradle 20 is seated with the inner surfaces of bight portions 50 of cam brackets 46 resting on the side ropes 22, 24 respectively. The cam levers 48 are inserted into the openings defined by cam lever slots 58 and the side ropes 22, 24 respectively with the smallest dimensions of the cam levers 48 extending across the depth of the openings respectively. The cam levers 48 are rotated 90° thereby stressing the adjacent portions of the side ropes 22, 24 respectively and the cradle 20 is now rigidly secured to side ropes 22, 24 of the rope frame conveyor.

Referring now to FIG. 7 of the drawing a fragmentary view of a second embodiment of a conveyor apparatus constructed in accordance with the principles of this invention is shown. Inasmuch as only the left side of an idler supporting cradle 20' is shown in FIG. 7 it is to be understood of course that the right side of the cradle 20' has a cooperating identical structure to form a U-shaped cradle 20' similar to that shown in FIG. 1. Accordingly, for purposes of brevity, only the left side of the cradle 20' shown in FIG. 7 will be explained.

As shown in FIGS. 7 and 8 the left side of the base portion of the U-shaped cradle 20' consists of an elongated clamp bracket 68 which is L-shaped in transverse cross section and has the upright support members 30' and longitudinal tubular members 26' secured thereto in a manner which will be hereinafter described. The elongated clamp bracket 68 has a vertically oriented leg portion 70 and a horizontally oriented leg portion 72. A pair of elongated laterally spaced parallel tubular members 26' are suitably rigidly secured at their adjacent longitudinal ends at spaced portions along the longitudinal extent of the vertically oriented leg portion 70 of the clamp bracket 68. The arm portion of the left side of the U-shaped cradle shown in FIG. 7 comprises an elongated upright support member 30'. The support member 30' is rigidly secured at its base portion 32' to the horizontally oriented leg portion 72 at a location intermediate the longitudinal ends of the horizontally oriented leg portion 72. The end portion 34' remote from the base portion 32' of the support member 30' has a transverse opening 36' in which a suitable U-shaped hanger member 38' identical to that shown in the embodiment of FIG. 1 is pivotally mounted in a manner similar to that described in the embodiment of FIG. 1.

Referring now to FIG. 12 of the drawing it will be noted that the horizontally oriented leg portion 72 of the clamp bracket 68 has an opening located therein spaced inwardly of one longitudinal end thereof to slidably receive a bolt 82 therein for a purpose to be later described. The vertically oriented leg portion 70 of the clamp bracket 68 has a rectangular opening 76 located therein spaced inwardly of the one longitudinal end thereof substantially the same distance as the opening 74. The opening 76 is of a suitable size to receive a tongue portion of a jaw member 78 for a purpose to be described hereinafter.

The means for securing the cradle to the side ropes of a rope frame conveyor comprises a deformable block member 80, a jaw member 78, a bolt 82 and nut assembly 84, and a tightening member 110 all of which cooperates with the side rope 22' and clamp bracket 68 in a manner to be hereinafter described.

Referring to FIGS. 9 and 10, the jaw member 78 illustrated therein comprises a generally rectangular member 86 having a top surface 88 and a bottom surface 90. A rectangular tongue portion 92 extends laterally from the intermediate portion of one of the long sides of the rectangular member. The other long side 94 of the rectangular member 86 is curved upwardly to extend above the major portion of the top surface 88 as shown in FIG. 10. The side of the tongue portion 92 remote from the long sides of the rectangular member 86 has a raised surface 93 extending above the major portion of the top surface 88 thereof. Suitable transversely extending raised ribs 86 may be provided on the top surface 88 of the rectangular member 86 to assist in gripping the deformable block 80 located thereon in the assembled clamping structure. A suitable rectangular opening 98 extends through the rectangular member 86 normal to the top surface thereof. The opening 98 is spaced inwardly of and in axial alignment with the tongue portion 92. The rectangular opening 98 is of a suitable size to closely slidably receive the square portion of the bolt 82 to prevent the bolt 82 from turning therein.

Another component of the clamping means consists of a deformable block 80 formed of a suitable resilient and deformable material such as rubber, for example. The deformable block 80 is formed from an elongated rectangular block 100 and is bevelled along one longitudinal edge 102 thereof as shown in FIG. 11. The block 100 has a top surface 104 and a bottom surface 106. An opening 108 is centrally located in the block 100 and extends through the top and bottom surfaces 104, 106 thereof to slidably receive a bolt 82 to be hereinafter described.

A suitable elongated bolt 82 having an enlarged head portion at one end thereof and a threaded portion on the other end thereof for threadedly receiving a suitable nut is provided for securing the clamping means together. The portion of the bolt immediately adjacent the head portion is of a suitable rectangular transverse cross section to be closely slidably received in the rectangular opening 98 in the jaw member 78.

The clamping means further comprises a generally D-shaped tightening member 110 having a curved or bight portion 112, a pair of laterally spaced elongated arm portions 114 of equal length extending from the ends respectively of the curved portion 112, and a transverse portion 116 connecting the ends of the arm portions 114 remote from the curved portion 112. The surface of the transverse portion 116 remote from the curved portion 112 is convex so as to provide a minimum of bearing contact area with the surface of the horizontally oriented leg portion of clamp bracket to eliminate excessive frictional drag during the tightening of the clamping means. The surface of the transverse portion 116 adjacent the curved portion is substantially flat. The transverse portion 116 has an opening extending therethrough which opening is located intermediate the arm portions 114. The opening extends normal to the flat surface of the transverse portion 116 and is of a suitable diameter to slidably receive the threaded portion of the bolt 82. The portions of arm portions 116 adjacent the transverse portion 114 of the tightening member 110 are laterally spaced a suitable distance to captively receive the diametrically opposed flat sides of the nut 84 therebetween and thus prevent the nut 84 from rotating with respect to the D-shaped tightening member 110.

Having described the component parts of the clamping means, the manner in which the clamping means is secured to the clamp bracket 68 will follow. Initially, the deformable block 80 is located on the clamp bracket 68 with the bevelled edge of the block 80 adjacent the interior angle formed by the intersection of the vertically oriented leg portion 70 and the horizontally oriented leg portion 72, and the openings 108, 74, in the block 100 and the horizontally oriented leg portion 72 respectively are aligned. Next the tongue portion 92 of the jaw member 78 is inserted in the rectangular opening 76 in the vertically oriented leg portion 70 of the clamp bracket 68 with the raised ribs 96 adjacent the deformable block 80 and the raised surface 93 of the tongue portion 92 being located so as to be in hooking engagement with the surface of the vertically oriented leg portion 70 adjacent the ends of the tubular members 26. Next, the threaded portion of the bolt 82 is inserted through the opening in the jaw member 78 through the opening 108 in the deformable block 80, and through the opening 74 in the horizontally oriented leg portion 72 of the clamp bracket 68 until the rectangular portion of the bolt 82 is inserted into its cooperating rectangular opening 98 in the jaw member 78, next the nut 84 is captively located between the arm portions 114 of the tightening member 110 and then the threaded portion of the bolt 82 is inserted through the opening in the transverse portion 112 and into engagement with the threaded opening of the nut 84. The tightening member 110 with its captively located nut 84 is then rotated so as to threadedly engage the nut 84 and bolt 82. When the cradle 20' is in storage or being transported the tightening member 110 may be rotated sufficiently by hand to compress the deformable block 80 and thus secure the clamping means to the clamp bracket 68. Thus all of the component parts may be stored and transported as a unit without creating the necessity of storing or transporting any separate loose hardware.

To mount the cradle 20' shown in FIG. 7 on the side ropes 22, 24 of a rope frame conveyor the tightening members 110 are loosened and the cradle 20' is raised above the side ropes 22, 24 of a rope frame conveyor. The clamping means of the clamp brackets 68 are aligned with the side ropes 22, 24 respectively. The cradle 20' is lowered onto the side ropes 22, 24 and the side ropes 22, 24 are then inserted in the generally U-shaped channels defined by the curved portions formed on long sides 94 of the jaw members 78 and the lower flat surfaces clamp brackets 68 respectively. The tightening members 110 are rotated thus screwing the nut 84 onto the bolt 82 so as to draw the clamps 78 toward the jaw members brackets 68 whereupon the deformable blocks 80 being placed under compression become deformed about the outer peripheries of the side ropes 22, 24 respectively and the side ropes 22, 24 are further secured between the jaw members 78 and the clamp brackets 68 by being stressed in compression as shown in FIG. 15 thus securing the cradle 20' to the side ropes 22, 24 of the rope frame conveyor. It is to be noted with reference to FIG. 7 that the deformable block 80 and the side rope 22 is captively secured between the curved portion 94 of the jaw member 78 and the surface of the vertically oriented leg portion 70 of the clamp bracket 68 since the raised surface 93 on the tongue portion 92 of the jaw member 78 becomes in hooked engagement with the surface of the clamp bracket 68 adjacent the tubular members 26.

A third embodiment of a conveyor apparatus constructed in accordance with the principles of this invention is illustrated in FIGS. 13 and 14. In the embodiment shown in FIG. 13 it will be noted that the idler is supported directly from the side ropes rather than from the upright support members 30' of the cradle 20'. In the embodiment shown in FIG. 13 only the clamp brackets 68 and the cooperating clamping means are utilized in conjunction with the U-shaped hanger members 38' to provide a pivotable mounting means for the idler. It will be further noted with reference to FIG. 14 that the clamping means has been relocated in the intermediate portion of the clamp bracket 68. In securing the mounting means of the embodiment as illustrated in FIGS. 13 and 14 it will be noted that the horizontally oriented leg portion 72 of the clamp bracket 68 of the embodiment of FIG. 7 is now oriented in the vertical position and the vertically oriented leg portion 70 of the clamp bracket 68 is now oriented in a horizontal position above the respective side rope 22 or 24 to which the pivotable mounting means is to be secured. The pivotable mounting means are secured in transversely aligned pairs along the elongated side ropes 22, 24 respectively in the same manner as described with reference to the embodiment of FIG. 7 above. The U-shaped hanger members 38' are pivotably mounted about the curved portions 112 of the tightening members 110 respectively. The trunnions 42 of the bearing housings 44 located at the longitudinal end portions of the idler are then pivotably mounted in the U-shaped pivotable mounting means 40 at the ends of the idler respectively and are held there by gravity. If desired suitable means may be provided in the U-shaped hanger member 38' to captively locate the trunnions 42 of the bearing housing 44 within the pivotal mounting means.

It is to be understood of course that although a cradle 20, 20' having means for pivotably mounting a flexible idler has been illustrated with reference to the embodiments of FIGS. 1 and 7, if desired a suitable cradle may be provided for mounting a non-flexible idler thereon.

Having described the preferred embodiments of this invention in accordance with the Patent Statutes, it is to be realized that modifications thereof may be made without departing from the broad spirit and scope of this invention described hereinabove. Accordingly, it is respectfully requested that the appended claims be interpreted as broadly as possible and be limited only by the prior art.

What is claimed is:

1. A conveyor apparatus comprising: a pair of laterally spaced elongated side ropes extending longitudinally along an elongated path; a plurality of clamps longitudinally spaced in transversely aligned spaced pairs engaging a portion of said side ropes; each of said clamps comprising an elongated member having a threaded end portion, a deformable resilient member encompassing said elongated member adjacent the other end thereof, an elongated jaw member supported by said elongated member between said other end of said elongated member and said resilient member, said jaw member extending laterally of said elongated member with the ends thereof extending beyond said resilient member, one of said ends of said jaw member constituting means for restraining said jaw member against rotational movement with respect to said elongated member, a support member encompassing said elongated member adjacent the threaded end portion, a tightening member having a U-shaped portion and a transverse portion with an opening in the transverse portion thereof freely slidable over said threaded end with the arms thereof extending away from said other end, a nut threadedly received on said threaded end axially outwardly of said transverse portion movable toward and away from said end for deforming said resilient member between said jaw member and said support member into clamping engagement with a portion of said side rope, said arms being formed to captively receive said nut therebetween, and means located on the U-shaped portion of said tightening member for mounting an idler thereon.

2. A conveyor apparatus comprising: a pair of laterally spaced elongated side ropes extending longitudinally along an elongated path; a plurality of clamps longitudinally spaced in transversely aligned spaced pairs engaging a portion of said side ropes; each of said clamps comprising an elongated member having a threaded end portion, a deformable resilient member encompassing said elongated member adjacent the other end thereof, a jaw member supported by said elongated member between said other end of said elongated member and said resilient member, said jaw member having a portion extending laterally of said elongated member outwardly beyond said resilient member, a support member encompassing said elongated member adjacent the threaded end portion, a tightening member having a U-shaped portion and a transverse portion with an opening in the transverse portion thereof freely slideable over said threaded end portion with the arms thereof extending away from said other end, a nut threadedly received on said threaded end axially outwardly of said transverse portion movable toward and away from said other end for deforming said resilient member between said jaw member and said support member into clamping engagement with a portion of said side rope, said arms being formed to captively receive said nut therebetween, and means located on the U-shaped portion of said tightening member for mounting an idler thereon.

3. A conveyor apparatus comprising: a pair of laterally spaced elongated side ropes extending longitudinally along an elongated path; a plurality of clamps longitudinally spaced in transversely aligned spaced pairs engaging a portion of said side ropes; each of said clamps comprising an elongated member having a threaded end portion; a deformable resilient member freely encompassing said elongated member adjacent the other end thereof, a jaw member captively supported by said elongated member and rotatable with respect thereto between said other end of said elongated member and said resilient member, said jaw member having a portion extending laterally of said elongated member outwardly beyond said resilient member, a support member encompassing said elongated member adjacent the threaded end portion, a tightening member having a U-shaped portion and a transverse portion with an opening in the transverse portion thereof freely slideable over said threaded end with the arms thereof extending away from said other end, a nut threadedly received on said threaded end axially outwardly of said transverse portion movable toward and away from said other end for deforming said resilient member between said jaw member and said support member into clamping engagement with a portion of said side rope to captively receive said nut therebetween, and means located on the U-shaped portion of said tightening member for mounting an idler thereon.

References Cited by the Examiner

UNITED STATES PATENTS

| | | | |
|---|---|---|---|
| 1,408,834 | 3/22 | Seavey. | |
| 1,426,535 | 8/22 | Barton. | |
| 1,732,033 | 10/29 | Snead | 24—135 |
| 1,761,978 | 6/30 | Black | 85—1 |
| 1,888,669 | 11/32 | Hossfeld | 24—135 |
| 1,979,091 | 10/34 | Alsaker et al. | 24—135 X |
| 2,698,077 | 12/54 | Baechli. | |
| 2,748,646 | 6/56 | Harold et al. | 81—59 |
| 2,775,044 | 1/57 | Lo Presti. | |
| 2,776,044 | 1/57 | Lo Presti. | |
| 2,875,886 | 3/59 | Lo Presti et al. | |
| 2,880,851 | 4/59 | Salmons. | |
| 2,948,384 | 8/60 | Pate. | |
| 2,964,728 | 12/60 | Wilson | 24—135 X |
| 3,038,588 | 6/62 | Arndt et al. | |

SAMUEL F. COLEMAN, *Primary Examiner.*

JULIUS E. WEST, WILLIAM B. LA BORDE,
*Examiners.*